United States Patent [19] — [11] 4,430,191
Sone et al. — [45] Feb. 7, 1984

[54] SYSTEM FOR FEEDBACK CONTROL OF AIR/FUEL RATIO IN IC ENGINE WITH MEANS TO CONTROL CURRENT SUPPLY TO OXYGEN SENSOR

[75] Inventors: Kohki Sone, Tokyo; Thuyoshi Kitahara, Yokohama, both of Japan

[73] Assignee: Nissan Motor Co., Ltd., Yokohama, Japan

[21] Appl. No.: 389,380

[22] Filed: Jun. 17, 1982

[30] Foreign Application Priority Data

Jun. 25, 1981 [JP] Japan ................................ 56-98624

[51] Int. Cl.$^3$ ............................................ G01N 27/46

[52] U.S. Cl. .................................. 204/401; 204/425; 204/426; 204/427; 204/429

[58] Field of Search .............. 204/15, 195 S, 424-429, 204/401

[56] References Cited

U.S. PATENT DOCUMENTS 4,224,113 9/1980 Kimura et al. .................. 204/195 S
4,332,225 6/1982 Cox et al. ........................ 204/195 S
4,359,030 11/1982 Sone et al. ....................... 204/195 S

FOREIGN PATENT DOCUMENTS 52-46890 4/1977 Japan .............................. 204/195 S

*Primary Examiner*—T. Tung
*Attorney, Agent, or Firm*—Schwartz, Jeffery, Schwaab, Mack, Blumenthal & Koch

[57] ABSTRACT

An air/fuel ratio control system including an oxygen sensor disposed in the exhaust gas to provide a feedback signal. The oxygen sensor is of the solid electrolyte concentration cell type having a heater and is operated with supply of a DC current to the concentration cell to maintain a reference oxygen partial pressure therein. A fuel feed control circuit in this system shifts its closed-loop control function to open-loop aiming at a lower air/fuel ratio if the output of the oxygen sensor continues to indicate that actual air/fuel ratio remains on one side of the intended air/fuel ratio due to breaking of the heater. To prevent the engine from stalling or operating unstably due to excessive increase in the air/fuel ratio before the shift to open-loop control, the system includes means for detecting breaking of the heater and immediately interrupting the current supply to the concentration cell in the oxygen sensor thereby forcing the sensor to put out an output which is indicative of a very high air/fuel ratio and, hence, causes the control circuit to lower the air/fuel ratio before the interruption of the closed-loop control.

4 Claims, 7 Drawing Figures

SYSTEM FOR FEEDBACK CONTROL OF AIR/FUEL RATIO IN IC ENGINE WITH MEANS TO CONTROL CURRENT SUPPLY TO OXYGEN SENSOR

BACKGROUND OF THE INVENTION

1. Field of the Invention

This invention relates to a system for feedback control of the air/fuel ratio in an internal combustion engine, in which an oxygen sensor element is disposed in the exhaust gas. The sensor element is of the solid electrolyte oxygen concentration cell type provided with an electric heater to ensure proper functioning of the concentration cell and is operated with a supply of a DC current to maintain a reference oxygen partial pressure therein. More particularly, the present invention relates to a sub-system for controlling the supply of the current to the concentration cell in such an oxygen sensor element.

2. Discussion of the Prior Art

In recent internal combustion engines and particularly in automotive engines, it has become popular to perform electronic feedback control of air/fuel ratio by utilizing an oxygen sensor installed in an exhaust passage to provide an electrical feedback signal indicative of the air/fuel ratio of an air-fuel mixture actually supplied to the engine. Based on this feedback signal a control circuit commands a fuel-supplying apparatus such as electronically controlled fuel injection valves to regulate the rate of fuel feed to the engine so as to correct deviations of actual air/fuel ratio from an intended value.

Usually the aforementioned oxygen sensor is of the concentration cell type having a layer of an oxygen ion conductive solid electrolyte such as zirconia containing a small amount of a stabilizing oxide. In this field, a recent trend is to miniaturize the oxygen-sensitive element of the sensor by constructing it as a laminate of thin, film-like layers on a very small plate-shaped ceramic substrate. In an oxygen sensor element of this type it is necessary to maintain a reference partial pressure of oxygen at the interface between the solid electrolyte layer and a reference electrode layer in the laminate. As described in U.S. Pat. No. 4,224,113, a reference oxygen partial pressure of a nearly constant level can be maintained in this sensor element by continuously supplying a DC current on the order of $10^{-6}$ to $10^{-5}$ A to the concentration cell part of the sensor element. This current flows through the solid electrolyte layer thereby forcing oxygen ions to migrate in the solid electrolyte layer in a predetermined direction. Since the solid electrolyte does not function properly at temperatures below a certain level, such as about 400° C., the substrate of the oxygen sensor element is provided with a heater to which an adequate voltage is applied to maintain the sensor element at a nearly constant temperature.

In practice there is some probability that the heater in the oxygen sensor element would break during long use of the sensor element in the exhaust gases due to frequent changes in both temperature and flow velocity respectively over wide ranges. When the heater breaks, the output of the oxygen sensor element begins to falsely indicate that the oxygen concentration in the exhaust gas remains at a considerably low level, or, in other words that the actual air/fuel ratio in the engine is constantly lower than the intended value, irrespective of the actual oxygen concentration in the exhaust gas. Therefore, the control circuit in the air/fuel ratio control system is designed to interrupt the feedback control of air/fuel ratio if the output of the oxygen sensor element continues to indicate that the actual air/fuel ratio is at a relatively low level for a predetermined length of time and, instead, to produce a constant control signal to keep the rate of fuel feed to the engine at a predetermined constant value corresponding to an air/fuel ratio value which is somewhat lower than the optimum air/fuel ratio determined by the feedback control. However, it is inevitable that during the monitoring period before the shift from the closed-loop control to the open-loop control, the rate of fuel feed is varied on the basis of the incorrect feedback signal provided by the oxygen sensor element suffering from the broken heater. If the heater breaks while the actual air/fuel ratio is above the target value, the closed-loop control of air/fuel ratio during the monitoring period results in a serious problem because the control circuit continues to put out a control signal that causes further increase in the air/fuel ratio in response to the incorrect feedback signal, so that the engine is fed with an excessively lean mixture. Consequently the engine is liable to lose operational stability and even stall in some cases.

SUMMARY OF THE INVENTION

It is an object of the present invention to provide an improved air/fuel ratio control system, which is fundamentally of the above described type but has the ability to automatically and sufficiently lower the air/fuel ratio if the heater in the oxygen sensor element breaks irrespective of the direction of deviation of the actual air/fuel ratio at the moment of the heater breaking from the predetermined air/fuel ratio as the target of the feedback control.

A system according to the invention for feedback control of the air/fuel ratio of an air-fuel mixture supplied to an internal combustion engine has an oxygen sensor element, which is disposed in an exhaust passage of the engine and has an electric heater and an oxygen concentration cell including an oxygen ion conductive solid electrolyte layer and reference and measurement electrode layers laid respectively on the solid electrolyte layer, power supply means for applying a controlled voltage to the aforementioned heater, sensor control means for supplying a controlled DC current to the concentration cell in the oxygen sensor element such that the current flows in the solid electrolyte layer between the reference and measurement electrode layers to cause oxygen ions to migrate in the solid electrolyte layer toward the reference electrode layer to thereby maintain a reference oxygen partial pressure at the interface between the reference electrode layer and the solid electrolyte layer, and fuel feed control means for controlling the rate of fuel feed to the engine so as to correct deviations of actual air/fuel ratio from a predetermined first air/fuel ratio by utilizing an output voltage of the oxygen sensor element as a feedback signal representative of actual air/fuel ratio but maintaining a constant fuel feed rate corresponding to a predetermined second air/fuel ratio lower than the first air/fuel ratio if the output voltage of the oxygen sensor element continuously indicates that the actual air/fuel ratio remains on one side of the first air/fuel ratio. As the improvement according to the invention, this air/fuel ratio control system comprises a detection means for detecting breaking of the heater in the oxygen sensor element during operation of the system and producing an electrical signal indicative of the occurrence of breaking of the heater and interruption means for interrupting the supply of the DC current from the sensor control means to the concentration cell in the oxygen sensor element in response to the electrical signal produced by the detection means.

The immediate interruption of the current supply to the concentration cell in the oxygen sensor element upon breaking of the heater results in sharp lowering of the reference oxygen partial pressure in the concentration cell. Accordingly the output of the oxygen sensor element soon varies to a level corresponding to a very high air/fuel ratio whether the true value of actual air/fuel ratio is above or below the first air/fuel ratio as the target of the feedback control. Therefore, the fuel feed control means continues to increase the fuel feed rate to thereby lower the air/fuel ratio until the shift of its function to the open-loop control with the aim of the second air/fuel ratio.

Thus, the improvement according to the invention has the effect of preventing the air/fuel ratio from excessively increasing during the monitoring period between the occurrence of breaking of the heater in the oxygen sensor element and the commencement of the constant rate feed of fuel to maintain a sufficiently low air/fuel ratio irrespective of the actual air/fuel ratio value at the moment of the heater breaks. Therefore, the engine under the control of this system does not stall or become unstable in its operation even when the heater in the oxygen sensor element breaks while the actual air/fuel ratio is above the predetermined first air/fuel ratio.

DESCRIPTION OF THE PREFERRED EMBODIMENT

Figure 1:
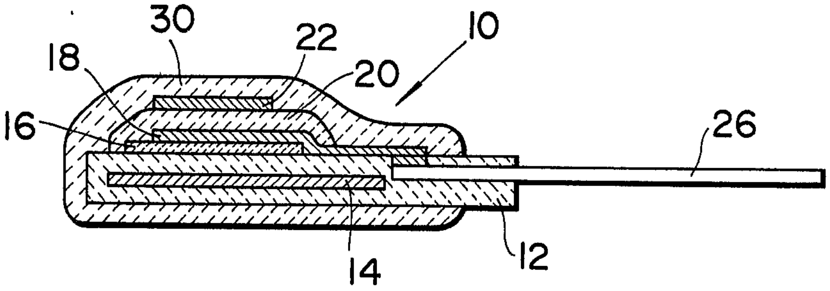
FIG. 1 is an explanatory sectional view of an oxygen sensor element used in the present invention.
Figure 2:
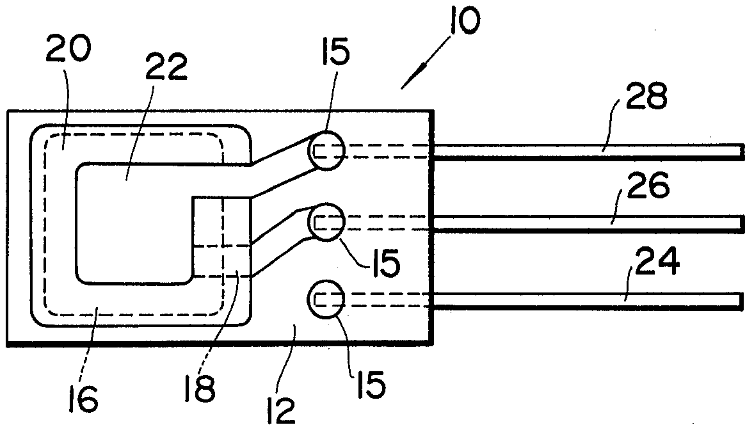
FIG. 2 is an explanatory plan view of the oxygen sensor element of FIG. 1.

FIGS. 1 and 2 show a known oxygen sensor element 10 which is used in an air/fuel ratio control system according to the invention. A structurally basic member of this element 10 is a plate-shaped substrate 12 made of an electrically insulating ceramic material such as alumina. A heater 14 (omitted from illustration in FIG. 2) in the form of either a thin film-like layer or a thin wire of a suitable metal such as platinum is embedded in the substrate 12. It is a usual practice to prepare the substrate 12 by face-to-face bonding of two ceramic sheets one of which is precedingly provided with the heater 14.

The sensitive part of this oxygen sensor element 10 takes the form of a laminate of thin layers supported on the ceramic substrate 12. The laminate includes an intermediate layer 16 formed on a major surface of the substrate 12 so as to cover a sufficiently large area of the substrate surface. This intermediate layer 16 is formed of a ceramic material. An inner electrode layer 18, which is often called reference electrode layer, lies on the upper surface of the intermediate layer 14 so as to leave a marginal region of the surface of the intermediate layer 14 uncovered. Platinum is a typical material for this electrode layer 18. A layer 20 of an oxygen ion conductive solid electrolyte such as $ZrO_2$ containing a small amount of a stabilizing oxide such as $Y_2O_3$ or CaO closely covers the upper surface of the inner electrode layer 18 and comes into direct contact with the marginal region of the intermediate layer 16, so that the inner electrode layer 18 is substantially entirely enclosed by the intermediate layer 16 and the solid electrolyte layer 20. This solid electrolyte layer 20 has a microscopically porous structure. An outer electrode layer 22, which is usually formed of platinum and often called measurement electrode layer, lies on the upper surface of the solid electrolyte layer 20. The thus constructed laminate has a total thickness of about 70 microns for example, and each layer of this laminate can be formed by utilizing a so-called thick-film technique.

This oxygen sensor element 10 has three lead wires 24, 26, 28, usually of platinum, which are inserted into the substrate 12 in their tip portions. The first lead wire 24 is connected to one terminal of the heater 14 within the substrate 12. The second lead wire 26 is connected to the inner electrode layer 18 by using one of holes 15 formed in the upper half of the substrate 12 and a conductor filled in the hole 15. In a similar manner, the third lead wire 28 is connected to the outer electrode layer 22, and this lead wire 28 is connected also to the other terminal of the heater 14.

As is known, the solid electrolyte layer 20 and the two electrode layers 18 and 22 constitute an oxygen concentration cell that generates an electromotive force when there is a difference between a partial pressure of oxygen on the outer electrode side of the solid electrolyte layer 20 and an oxygen partial pressure on the inner electrode side of the same layer 20. The intermediate layer 16 is not essential to the oxygen concentration cell, but this layer 16 is added for the purpose of enhancing the strength of adhesion of the laminated oxygen concentration cell to the ceramic substrate 12. Preferably, the intermediate layer 16 is formed of the same solid electrolyte material as the one used for the layer 20.

The outer surfaces of the laminated sensitive part of this sensor element 10 and a major part of the substrate 12 are covered with a porous protecting layer 30 formed of a ceramic material such as spinel (in FIG. 2, the protecting layer 30 is omitted from illustration for simplicity), so that a gas subject to measurement comes into contact with the outer electrode layer 22 through the micropores in this protecting layer 30.

Figure 3:
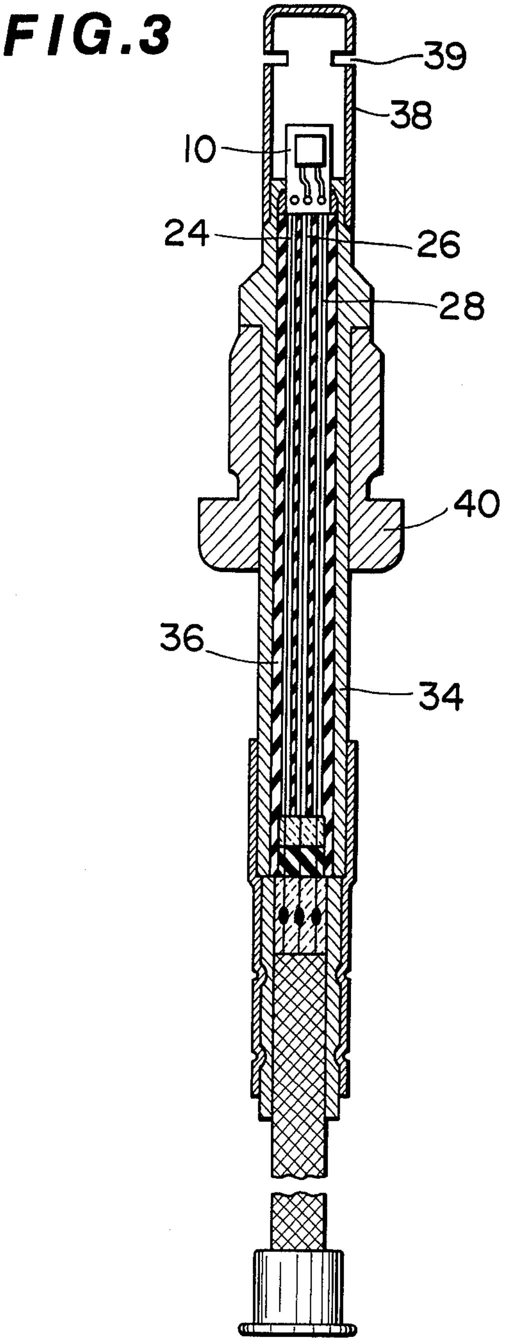
FIG. 3 is a longitudinal sectional view of an oxygen sensor which includes the sensor element of FIG. 1 and is so designed as to be useful in the exhaust system of an automotive engine.

FIG. 3 shows an exemplary construction of an oxygen sensor which utilizes the sensor element 10 of FIG. 1 and is designed for attachment to the exhaust pipes or exhaust manifolds of automotive internal combustion engines. This sensor has a tubular case 34 of stainless steel, and a rod 36 of an insulating ceramic material such as mullite is tightly fitted into the case 34. The oxygen sensor element 10 of FIG. 1 is fixedly mounted on a forward end of the ceramic rod 36, and the three lead wires 24, 26, 28 of the sensor element 10 are extended respectively through three axial holes (no numeral) bored in the ceramic rod 36. A cup-shaped hood 38 of stainless steel is fixed to the forward end of the tubular case 34 so as to enclose the sensor element 10 therein. The side wall of the hood 38 is formed with apertures 39 to admit the exhaust gas into the interior of the hood 38, so that the oxygen sensor element 10 can be exposed to the exhaust gas. To insert only the hooded end portion of the sensor into the exhaust pipe and fix the sensor to a boss provided to the exhaust pipe, a threaded metal body 40 is fitted around the tubular case 34 in a region close to the hood 38.

To detect the concentration of oxygen in the exhaust gas by using this oxygen sensor to thereby detect the air/fuel ratio of an air-fuel mixture actually supplied to the engine, it is necessary to produce and maintain a nearly constant partial pressure of oxygen at the interface between the inner electrode layer 18 and the solid electrolyte layer 20 in the oxygen sensor element 10. For this purpose, a DC current is supplied from an external power source to the sensor element 10 by using the second and third lead wires 26 and 28 such that the current flows in the solid electrolyte layer 20 from the inner electrode layer 18 toward the outer electrode layer 22. Besides, a suitable voltage is applied to the heater 14 from a separate power source by using the first and third lead wires 24 and 28. Thus, the third lead wire 28 serves as a grounding lead common to the oxygen concentration cell in the sensor element 10 and the heater 14. To measure an electromotive force the sensor element 10 generates, a potentiometer or an alternative instrument is connected between the inner and outer electrode layers 18 and 22, i.e. between the second and third lead wires 26 and 28.

The flow of the DC current in the solid electrolyte layer 20 causes oxygen ions to migrate through the solid electrolyte layer 20 from the outer electrode layer 22 toward the inner electrode layer 18, and an increasing quantity of oxygen ions migrate in this way as the intensity of the DC current is augmented. The oxygen ions arriving at the inner electrode layer 18 are converted to oxygen molecules, which gradually diffuse outwards through the micropores in the solid electrolyte layer 20. Consequentially an oxygen partial pressure of a nearly constant magnitude determined by a balance between the inflow of oxygen ions and the outflow of oxygen molecules is maintained at the interface between the inner electrode layer 18 and the solid electrolyte layer 20. The source of the oxygen ions migrating from the outer electrode layer 22 toward the inner electrode layer 18 is oxygen molecules diffused through the porous protecting layer 30 from the ambient gas atmosphere subject to measurement toward the outer electrode layer 22. Accordingly the level of an oxygen partial pressure at the outer electrode layer 22 is determined by the proportion of the oxygen ions migrating toward the inner electrode 18 to the oxygen molecules supplied to the outer electrode layer 22 through the porous protecting layer 30. By appropriately determining the intensity of the DC current flowing in the solid electrolyte 20, it is possible to make the oxygen partial pressure $P_1$ at the inner electrode layer 18 higher than the oxygen partial pressure $P_2$ at the outer electrode layer 22. Under these conditions, the oxygen sensor element 10 generates an electromotive force E according to the Nernst's equation $$E = \frac{RT}{4F} \ln \frac{P_1}{P_2}$$

where R is the gas constant, F is the Faraday constant, and T represents the absolute temperature.

Since the oxygen partial pressure $P_2$ at the outer electrode layer 22 is approximately proportional to the partial pressure or concentration of oxygen in the gas subject to measurement, the magnitude of the electromotive force E depends on the concentration of oxygen in the gas subject to measurement so long as the temperature of the concentration cell part of the oxygen sensor element 10 and the intensity of the DC current flowing in the solid electrolyte layer 20 remain unchanged and lower as the oxygen concentration in the gas becomes higher. During operation of the oxygen sensor element 10, a controlled voltage is applied to the heater 14 in the substrate 12 so as to maintain the concentration cell part of the sensor element 10 at a practically constant temperature.

Figure 4:
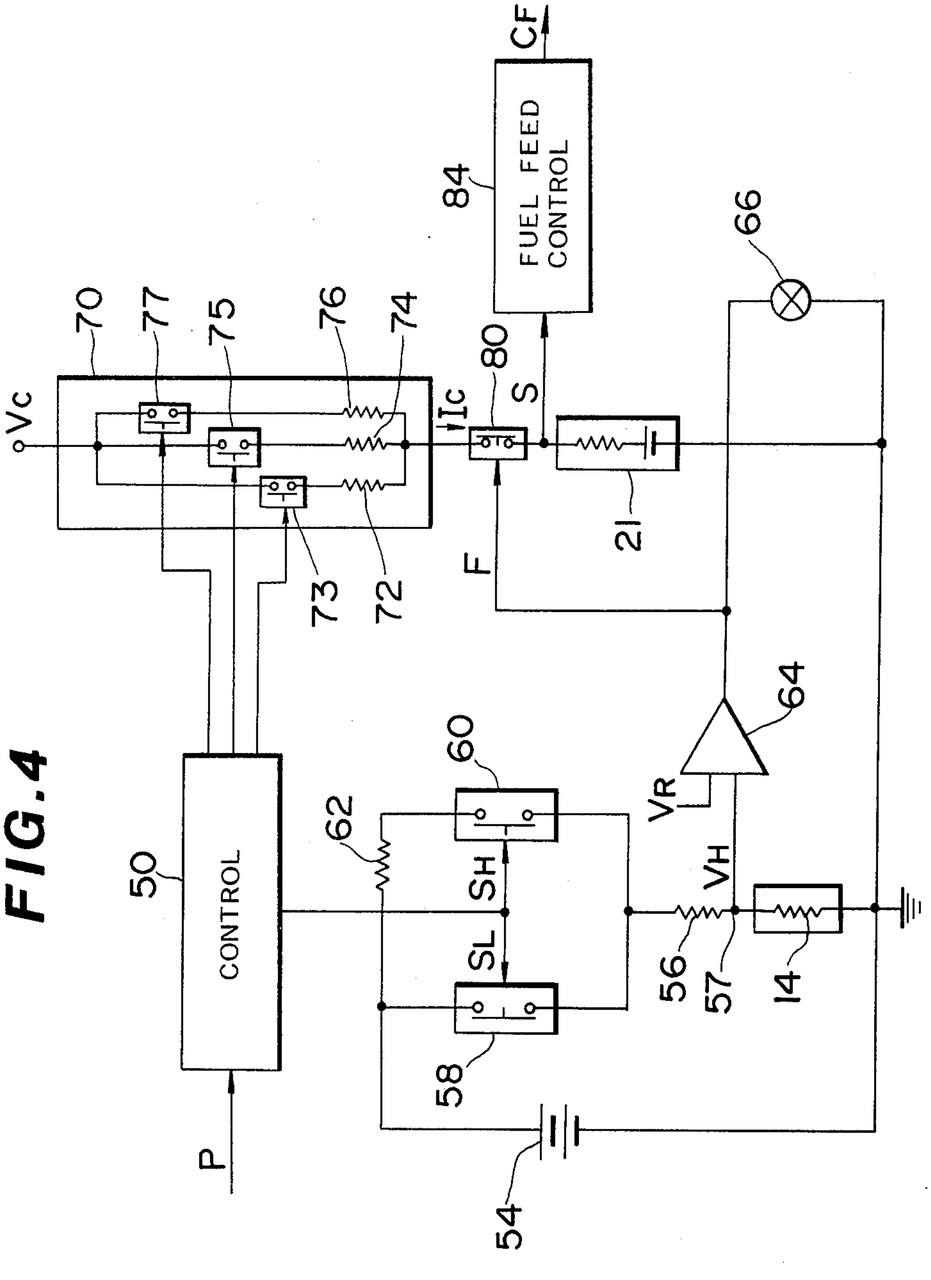
FIG. 4 is a circuit diagram showing an oxygen sensor controlling part of an air/fuel ratio control system as an embodiment of the present invention.

FIG. 4 shows an air/fuel ratio control system which embodies the present invention and includes the oxygen sensor element of FIG. 1 disposed in an exhaust passage (not shown) of an automotive engine. In this circuit diagram, reference numeral 21 represents the concentration cell part of the oxygen sensor element 10, i.e. the solid electrolyte layer 20 sandwiched between the outer and inner electrode layers 22 and 18, and the heater 14 in the sensor element 10 is indicated separately.

The heater 14 in the sensor element 10 is connectable to a battery 54 via a fixed resistor 56 and either of two electrically operatable switches 58 and 60 connected in parallel with each other, and a resistor 62 connected in series with the switch 60 becomes effective only when the switch 60 is closed. There is an electronic control unit 50 having the function of selectively closing one of the two switches 58 and 60 in response to signal P representative of the operating conditions of the engine. For example, the operational condition signal P may represent the revolutions of the engine, pulse width of a fuel injection signal, flow rate of air taken into the engine, magnitude of intake vacuum and/or the degree of opening of the throttle valve. By analyzing the operational condition signal P, the control unit 50 puts out a first switch control signal $S_L$ while the exhaust gas temperature is relatively low and a second switch control signal $S_H$ while the exhaust gas temperature is relatively high. The first control signal $S_L$ has the effect of selectively closing the switch 58, whereas the second control signal $S_H$ has the effect of selectively closing the other switch 60.

There is a current control circuit 70 to supply an adequate current $I_C$ to the concentration cell part 21 of the oxygen sensor element 10 by using a constant Dc power source $V_c$ for the purpose of maintaining a reference oxygen partial pressure in the concentration cell part 21. This circuit 70 has three fixed resistors 72, 74 and 76, which are connected in parallel and different in resistance, and three electrically operatable switches 73, 75 and 77 connected respectively in series with the three resistors 72, 74 and 76. The electronic control unit 50 has the function of selectively closing one of these three switches 73, 75 and 77 depending on the operating conditions of the engine represented by the above described signal P. A normally closed and electrically operatable switch 80 is interposed between the current control circuit 70 and the concentration cell part 21 of the sensor element.

Indicated at 84 is an electronic control unit which provides an air/fuel ratio control signal $C_F$ to an electronically controlled fuel supply means (not shown) based on a signal S produced by the concentration cell part 21 of the oxygen sensor element 10 disposed in the exhaust gas. This control unit 84 has the function of comparing the feedback signal S with a reference signal indicative of an intended air/fuel ratio and varying the control signal $C_F$ so as to correct a deviation of actual air/fuel ratio from the intended ratio found by the comparison operation.

According to the invention, the air/fuel ratio control system of FIG. 4 includes a comparator 64 which makes a comparison between a voltage $V_H$ at the junction point 57 between the fixed resistor 56 and the heater 14 in the oxygen sensor element and a reference voltage $V_R$, which is higher than a normally expected maximum value of the voltage across the heater 14 but lower than the open-circuit voltage of the battery 54. This comparator 64 is employed as a sensor to detect breaking of the heater 14 and puts out a "H" output signal F only when the measured voltage $V_H$ is higher than the reference voltage $V_R$. This "H" output F of the comparator 64 has the effect of opening the aforementioned normally closed switch 80 to result in interruption of the supply of the current $I_c$ to the concentration cell part 21 of the sensor element. Also, the "H" output of the comparator 64 causes a warning lamp 66 is installed in the dashboard of the automobile, to light.

Figure 5:
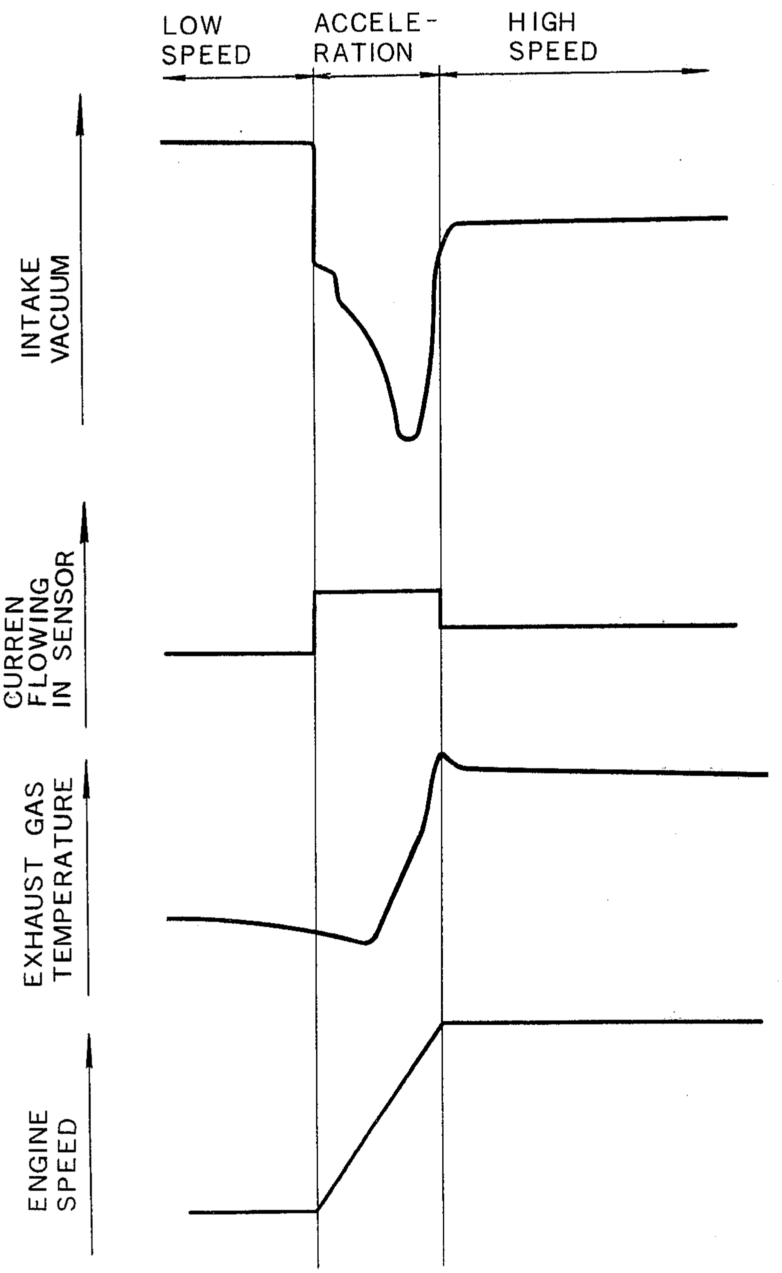
FIG. 5 is a chart showing the dependence of the level of intake vacuum, temperature of exhaust gas and the intensity of current supplied to the concentration cell in the oxygen sensor element in the system of FIG. 4 on the revolutions of the engine.

The operation of the control unit 50 will be described more in detail with reference to FIG. 5. For simplicity, it is assumed that the operational condition signal P in FIG. 4 represents the magnitude of intake vacuum at a section downstream of the main throttle valve. The magnitude of the intake vacuum is considerably great while the engine is operating at a relatively low speed. When the engine is accelerated by widely opening the throttle valve there occurs a sharp drop in the magnitude of the intake vacuum, and when the engine speed stabilizes at a relatively high level the intake vacuum stabilizes at a magnitude somewhat smaller than the level during the low speed operation of the engine.

Therefore, the control unit 50 can respond to the change in the engine speed to control the three switches 73, 75 and 77 in the current control circuit 70 as follows. As to the three resistors 72, 74 and 76, it is assumed that the resistor 72 has the highest resistance and the resistor 76 has the lowest resistance. During low speed operation of the engine only the switch 73 is kept closed so that the intensity of the current $I_c$ flowing into the concentration cell part 21 of the oxygen sensor element is of a relatively low intensity determined by the high resistance of the resistor 72. During acceleration, the control unit 50 commands the switch 77 to close instead of the switch 73 to increase the current $I_c$ to a highest level determined by the low resistance of the resistor 76. Upon stabilization of the engine speed at a high level, the switch 75 is closed instead of the switch 77 to utilize the resistor 74 having a medium resistance, so that the intensity of the current $I_c$ becomes somewhat above the level during the low speed operation of the engine.

The acceleration of the engine is accompanied by a considerable rise in the exhaust gas temperature from a relatively low level during low speed operation, though there is some time lag, and the exhaust gas temperature remains at a high level during high speed operation of the engine. Therefore, the control unit 50 can deduce the level of exhaust gas temperature from the operating condition signal P, though it is optional to alternatively use a temperature sensor disposed in the exhaust gas. The control unit 50 puts out the control signal $S_L$ to keep the switch 58 closed while the exhaust gas temperature is relatively low, whereby a relatively high voltage is applied to the heater 14 in the oxygen sensor element. When the exhaust gas temperature rises to a predetermined level, the control unit 50 puts out the control signal $S_H$ to close the switch 60 instead of the switch 58 to thereby utilize the resistor 62 with the effect of lowering the voltage applied to the heater 14. By controlling the heating voltage in this manner, it is possible to maintain the concentration cell part of the oxygen sensor element at a nearly constant temperature.

The function of the air/fuel ratio control unit 84 with the provision of the comparator 64 and switch 80 in FIG. 4 will be described more in detail with reference to FIG. 6.

Figure 6:
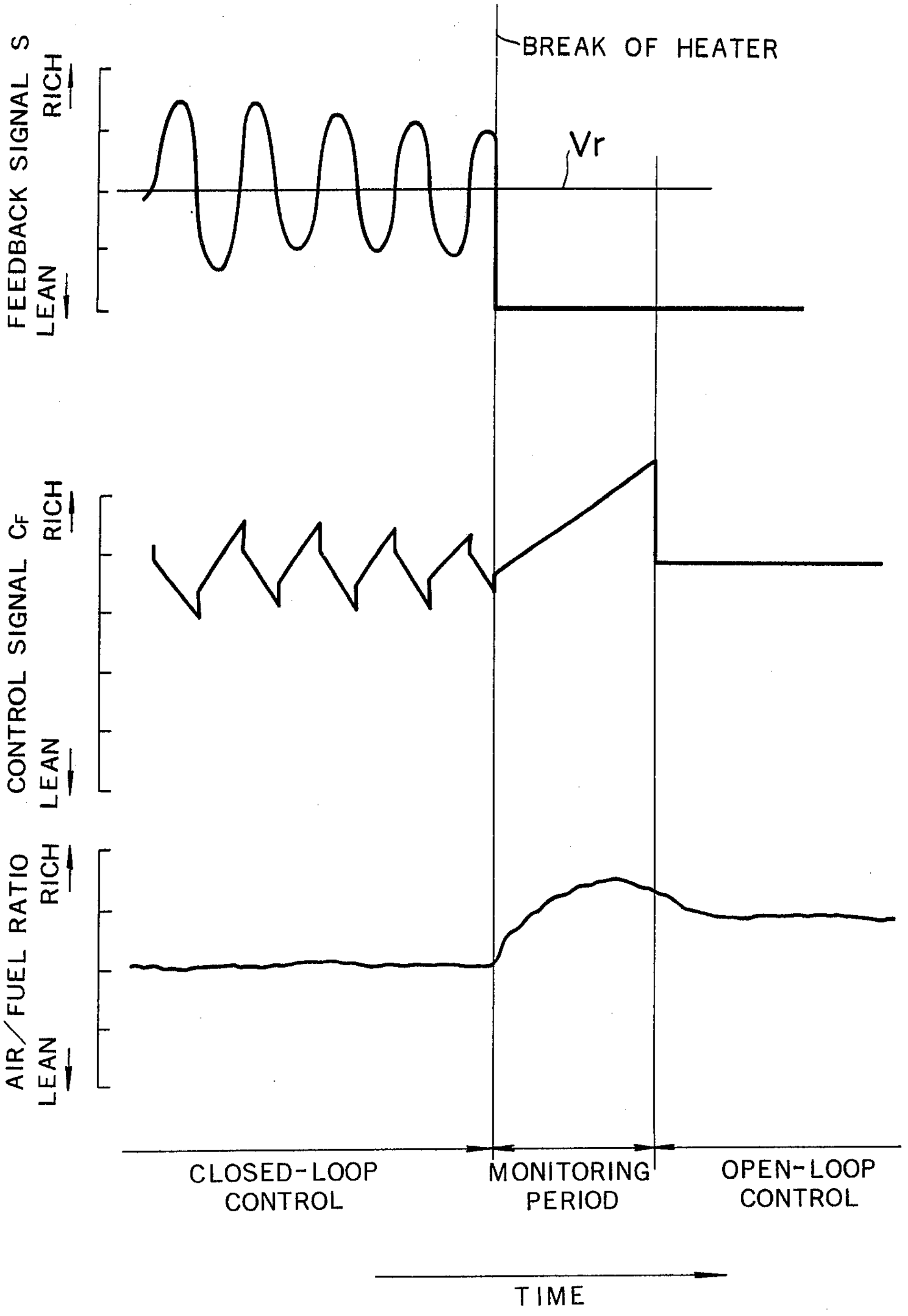
FIG. 6 is a chart illustrating the functions of the oxygen sensor element and control circuit in the system of FIG. 4 in the case of breaking of the heater in the sensor element and the manner of variations in the air/fuel ratio under the control of same system.

While the control unit 84 performs closed-loop control of the air/fuel ratio by using the feedback signal S produced by the normal function of the oxygen sensor element, the level of the feedback signal S will fluctuate about a reference voltage $V_r$ indicative of the intended air/fuel ratio as shown in the chart of FIG. 6, and the control signal $C_F$ as the output of the control unit 84 exhibits a periodical change in its amplitude or meaning so as to correct the fluctuations of the air/fuel ratio represented by the feedback signal S. Consequentially the air/fuel ratio can be maintained within a very narrow range with the intended ratio as the middle point.

If the heater 14 in the oxygen sensor element breaks during operation of the air/fuel ratio control system, the voltage $V_H$ at the junction point 57 in FIG. 4 rises immediately and considerably to become close to the voltage of the battery 54 and above the reference voltage $V_R$. Then the comparator 64 produces the "H" output F to open the switch 80 and light the warning lamp 66. Since the opening of the switch 80 results in sudden interruption of the supply of the current $I_c$ to the concentration cell part 21 of the oxygen sensor element, there occurs a sharp decrease in the reference oxygen partial pressure in the concentration cell part 21. Therefore, the output S of the oxygen sensor element exhibits a sharp drop irrespective of the actual air/fuel ratio or actual concentration of oxygen in the exhaust gas. As mentioned hereinbefore, lowering in the level of the sensor output S indicates that the oxygen concentration in the exhaust gas has increased and, hence, that the air/fuel ratio in the engine has become higher or shifted toward the lean side. Therefore, the control unit 84 responds to the sudden change in the level of the feedback signal S by so varying the control signal $C_F$ as to greatly vary the air/fuel ratio toward the rich side during the monitoring period from the moment of breaking of the heater 14 until fixing of the fuel feed rate at a constant value.

Thus, in the air/fuel ratio control system of FIG. 4, breaking of the heater 14 in the oxygen sensor element does not result in the supply of an excessively lean mixture to the engine even if the heater 14 breaks while a relatively lean mixture is fed to the engine. Therefore, the shift of the closed-loop control of air/fuel ratio to the predetermined open-loop control upon breaking of the heater 14 can be accomplished without suffering from unstable operation or stall of the engine during the monitoring period.

Figure 7:
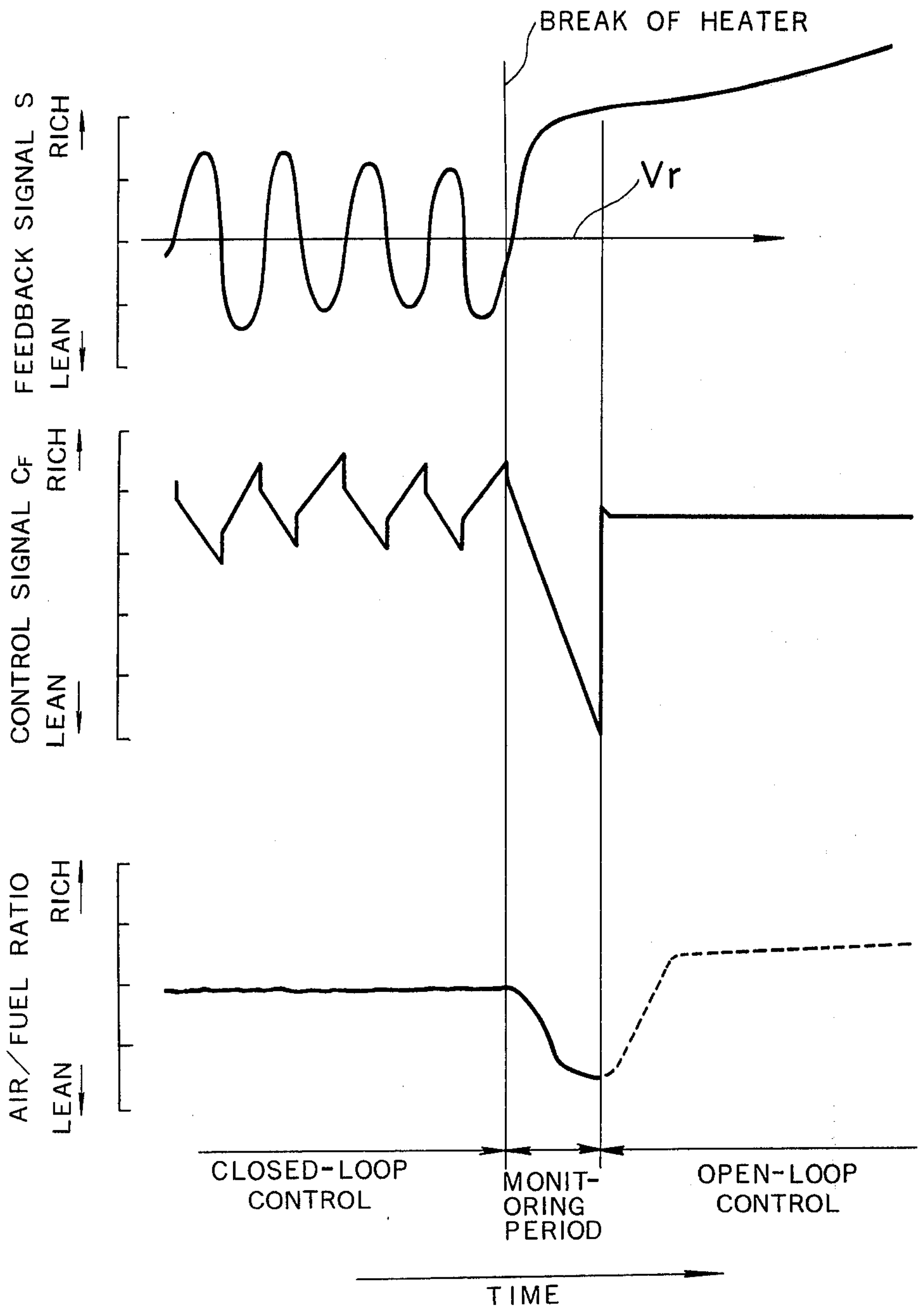
FIG. 7 is a chart corresponding to the chart of FIG. 6 with respect to an air/fuel ratio control system which resembles the system of FIG. 4 but is not in accordance with the invention.

For comparison, if the heater 14 of the oxygen sensor element breaks during operation of an air/fuel ratio control system which fundamentally resembles the system of FIG. 4 but does not include the comparator 64 and switch 80 shown in FIG. 4 or any alternative thereto, the signals S and $C_F$ and the air/fuel ratio vary in the manners as illustrated in FIG. 7, assuming that the actual air/fuel ratio at the moment of breaking of the heater 14 is above the intended air/fuel ratio. In this case the current $I_c$ is continuously supplied to the concentration cell part 21 of the oxygen sensor element even after breaking of the heater 14. Therefore, the interruption of heating of the oxygen sensor element by breaking of the heater 14 results in that the output S of the oxygen sensor element gradually rises as if the air/fuel ratio were shifting toward the lower or rich side although the actual air/fuel ratio is relatively high. Accordingly, the air/fuel ratio control signal $C_F$ so varies as to progressively vary the air/fuel ratio toward the lean side during the monitoring period from the moment of breaking of the heater 14 until fixing of the fuel feed rate at a constant value. For this reason there is a considerable possibility that the engine will become unstable in its operation or even stall due to excessive leanness of the air-fuel mixture supplied thereto during the monitoring period.

What is claimed is:

1. A system for feedback control of the air/fuel ratio of an air-fuel mixture supplied to an internal combustion engine, comprising:

an oxygen sensor element which is disposed in an exhaust passage of the engine and has an electric heater and an oxygen concentration cell including an oxygen ion conductive solid electrolyte layer and reference and measurement electrode layers laid respectively on the solid electrolyte layer, power supply means for applying a controlled voltage to said heater, sensor control means for supplying a controlled DC current to said concentration cell such that the current flows in the solid electrolyte layer between the reference and measurement electrode layers to cause oxygen ions to migrate in the solid electrolyte layer toward the reference electrode layer to thereby maintain a reference oxygen partial pressure at the interface between the reference electrode layer and the solid electrolyte layer, fuel feed control means for controlling the rate of fuel feed to the engine so as to correct deviations of actual air/fuel ratio from a predetermined first air/fuel ratio by utilizing an output voltage of the oxygen sensor element as a feedback signal representative of actual air/fuel ratio but maintaining a constant fuel feed rate corresponding to a predetermined second air/fuel ratio lower than said first air/fuel ratio if the output voltage of the oxygen sensor element continues to indicate that the actual air/fuel ratio remains on one side of said first air/fuel ratio, detecting means for detecting breaking of the heater in the oxygen sensor element during operation of the system and producing an electrical signal indicative of the occurrence of breaking of the heater, and interruption means for interrupting the supply of said DC current from said sensor control means to said concentration cell in the oxygen sensor element in response to said electrical signal produced by said detection means, whereby, upon breakage of said heater, said output voltage of said oxygen sensor element remains above said first air/fuel ratio irrespective of the actual value of the air/fuel ratio.

2. A system according to claim 1, wherein said detection means comprises means for detecting the occurrence of breaking of said heater by detecting the magnitude of a voltage drop across said heater.

3. A system according to claim 1, wherein said power supply means comprises a constant voltage source and at least one resistor interposed between said constant voltage source and said heater, said detection means comprising a comparator which continuously makes a comparison between a constant reference voltage lower than the voltage of said constant voltage source and a terminal voltage at a junction point between said at least one resistor and said heater and produces said electrical signal only when said terminal voltage is higher than said reference voltage.

4. A system according to claim 3, wherein said interruption means comprises a normally closed and electrically operatable switch which is interposed between said current control means and said concentration cell and opens in response to said electrical signal produced by said comparator.

* * * * *